(12) United States Patent
King

(10) Patent No.: US 6,183,706 B1
(45) Date of Patent: *Feb. 6, 2001

(54) AUTOCLAVE HAVING AN AGITATOR WITH AN AERATING IMPELLER FOR HIGH OXYGEN TRANSFER RATE TO METAL-CONTAINING SLURRIES AND METHOD OF USE

(75) Inventor: James A. King, West Vancouver (CA)

(73) Assignee: Placer Dome, Inc., Vancouver (CA)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/038,448

(22) Filed: Mar. 11, 1998

(51) Int. Cl.⁷ ............................. C22B 11/00; C22B 15/00; C22B 19/00; B01F 13/02
(52) U.S. Cl. ................................ 423/23; 423/27; 423/30; 423/31; 423/109; 423/150.1; 422/226; 366/102; 261/87
(58) Field of Search ................................ 423/30, 31, 26, 423/27, 109, 99, 23, 150.5, 150.1; 422/225, 226, 231, 307, 309; 261/87; 209/169; 366/102

(56) References Cited

U.S. PATENT DOCUMENTS

| | | | |
|---|---|---|---|
| 2,928,661 | * 3/1960 | MacLaren . | |
| 3,414,245 | * 12/1968 | Frazer . | |
| 3,954,450 | * 5/1976 | Kuhn et al. | 423/95 |
| 4,022,866 | * 5/1977 | Kuhn et al. | 423/32 |
| 4,153,522 | * 5/1979 | Arbiter et al. | 423/33 |
| 4,265,739 | * 5/1981 | Dalton | 209/169 |
| 4,331,635 | * 5/1982 | Arbiter et al. | 423/33 |
| 4,974,816 | * 12/1990 | Emmett, Jr. et al. | 423/DIG. 17 |
| 5,698,170 | 12/1997 | King | 423/24 |

OTHER PUBLICATIONS

EKATO Pamphlet; "Mixing Update for Gassing Applications: EKATO S Self–Aspirating Impeller System"; 2 pages, which is believed to have been published in 1997, no month.

* cited by examiner

*Primary Examiner*—Steven Bos
(74) *Attorney, Agent, or Firm*—Sheridan Ross P.C.

(57) ABSTRACT

A method is disclosed for recovering a metal from a metal containing material by autoclaving with an autoclave which includes an agitator that includes a first inlet for a recycled oxygen-containing gas, a second inlet for a fresh oxygen-containing gas, an impeller having a plurality of outlets to recirculate or introduce the oxygen-containing gases into the slurry and a set of mixing blades located below the outlets to radially disperse gas bubbles substantially uniformly throughout the slurry. The outlets for the gas can be located in an intermediate set of blades for thorough dispersion of the gas bubbles in the slurry.

22 Claims, 2 Drawing Sheets

AUTOCLAVE HAVING AN AGITATOR WITH AN AERATING IMPELLER FOR HIGH OXYGEN TRANSFER RATE TO METAL-CONTAINING SLURRIES AND METHOD OF USE

FIELD OF THE INVENTION

The present invention is generally directed to autoclaves and specifically to autoclaves having high rates of oxygen transfer to metal-containing solutions.

BACKGROUND OF THE INVENTION

To oxidize sulfide sulfur and thereby permit solubilization of metals compounded with the sulfide sulfur, base metal ores and concentrates, and refractory gold ores and Concentrates are commonly treated by pressure oxidation. Pressure oxidation is typically performed by passing a feed slurry of a metal-containing material through a sealed autoclave (operating at superatmospheric pressure) having multiple compartments. To provide for oxidation of the sulfide sulfur in the slurry, oxygen is typically fed continuously to the autoclave by means of a sparge tube located below the impeller. Commonly a large portion of the oxygen reacts with the sulfide sulfur, but there is a smaller significant portion that is vented from the autoclave and may be considered not effectively utilized.

In designing an autoclave, there are a number of considerations. By way of example, the autoclave should permit reaction of as much of the oxygen as possible with sulfide sulfur. If the oxygen is inefficiently reacted with the sulfide sulfur, the autoclave can have higher oxygen plant capital and operating costs. The autoclave should provide as short a residence time as possible for a given volume of slurry while realizing a high rate of recovery for the metal. Finally, the autoclave should vent inert gases that build up in the autoclave above the slurry to prevent rupturing of the autoclave from high pressure gas. Some oxygen gas is inevitably vented along with these inert gases. Other processes, which rely on efficient and effective gas/liquid transfer of oxygen and which are commonly carried out in autoclaves, include catalytic chemistry reactions, such as the conversion of ferrous to ferric ions, reoxidation of NO by oxygen, and cuprous amine conversion to cupric amine.

SUMMARY OF THE INVENTION

These and other design objectives are satisfied by the autoclave of the present invention. The autoclave includes a vessel for containing a feed slurry material, such as a metal sulfide-containing slurry, or a liquid comprising dissolved chemical compounds and an impeller attached to a rotatable shaft for agitating the feed slurry material. The shaft has a passage for an oxygen-containing gas and an outlet in communication with the passage for dispersing the oxygen-containing gas in the slurry. In one configuration, the passage passes along the length of the rotatable shaft, and the outlet is located at or close to the tip of the impeller.

The autoclave can realize relatively high oxygen transfer rates to the feed slurry material relative to conventional autoclaves through better oxygen gas dispersion in the feed slurry material. Commonly, the autoclave can yield an oxygen transfer rate of at least about 2 kg moles oxygen/cubic meter of slurry/hour. At such high oxygen transfer rates, a high rate of metal recovery can be realized in a relatively short residence time, and therefore lower capital and operating costs for the autoclave equipment can be realized relative to conventional pressure oxidation processes.

The autoclave is able to accomplish such high oxygen transfer rates without the use of a sparge tube. The sparge tube has proven to be an ongoing source of maintenance problems in existing pressure oxidation processes.

To consume as much oxygen as possible, the rotatable shaft can have an inlet for the oxygen containing gas located at an upper end of the shaft that is above the slurry surface yet is contained within the vessel. The inlet will provide a suction, drawing the atmosphere in the autoclave into the passage. After passing through the passage, the gas is dispersed into the feed slurry material. In this manner, the oxygen is continuously recycled during pressure oxidation to provide a high rate of oxygen utilization. By efficiently reacting the oxygen, the autoclave can have lower oxygen plant capital and operating costs than conventional autoclaves.

New oxygen can be supplied to the autoclave either directly through the rotatable shaft or through a separate conduit such as one having an outlet in close proximity to the impeller shaft gas inlet or above the feed slurry material. In the latter case, the shaft must include the inlet at the upper end of the shaft to permit oxygen escaping from the agitated feed slurry material into the autoclave atmosphere and/or supplied to the atmosphere to be drawn into the shaft and thereby entrained in the agitated feed slurry material.

Autoclaves can include a discharge control means for controllably removing the gas atmosphere from the sealed autoclave to prevent rupture of the autoclave from high pressure gases. The system includes:

(a) analyzing means (e.g., a gas analyzer) for analyzing a selected component (e.g., carbon dioxide and/or molecular oxygen) in the gas atmosphere inside the autoclave;

(b) an outlet for removing gas in the gas atmosphere from the autoclave interior;

(c) a controller (e.g., a computer) for receiving a signal from the gas analyzer and generating a control signal in response thereto; and (c) a control means (e.g., a valve) for controlling the amount of gas removed in response to the control signal received from the controller. The control means vents the gas atmosphere when the amount of the component exceeds or falls below a threshold amount. In this manner, the autoclave can vent oxygen gas and other gases that build up in the autoclave above the slurry while maintaining the oxygen gas in the autoclave as long as possible for consumption in the oxidation of sulfide sulfur.

In operation, pressure oxidation using the autoclave follows the following steps:

(a) agitating a feed slurry material in the autoclave using the impeller, and (b) during the agitating step (a), passing an oxygen-containing gas through the rotatable shaft and dispersing the gas radially outward from the shaft into the feed slurry material. In one autoclave configuration, the gas is passed through a blade of the impeller outwardly into the slurry.

DETAILED DESCRIPTION

The present invention is directed to a sealed autoclave particularly useful for pressure oxidation of slurried ores and concentrates. Although the autoclave is discussed with reference to leaching processes, the autoclave is useful in numerous other applications including catalytic chemistry reactions. The autoclave includes an agitation assembly for discharging oxygen directly into the slurry. In this manner, the autoclave is able to realize relatively high rates of oxygen transfer into the slurry and, therefore, high oxidation rates and low residence times. The autoclave is particularly effective in the pressure oxidation of slurried metal sulfide-containing materials. The metal sulfides that can be effectively utilized include without limitation gold sulfides, iron sulfides, copper sulfides, zinc sulfides, nickel sulfides, and arsenic sulfides.

Figures 1, 2:
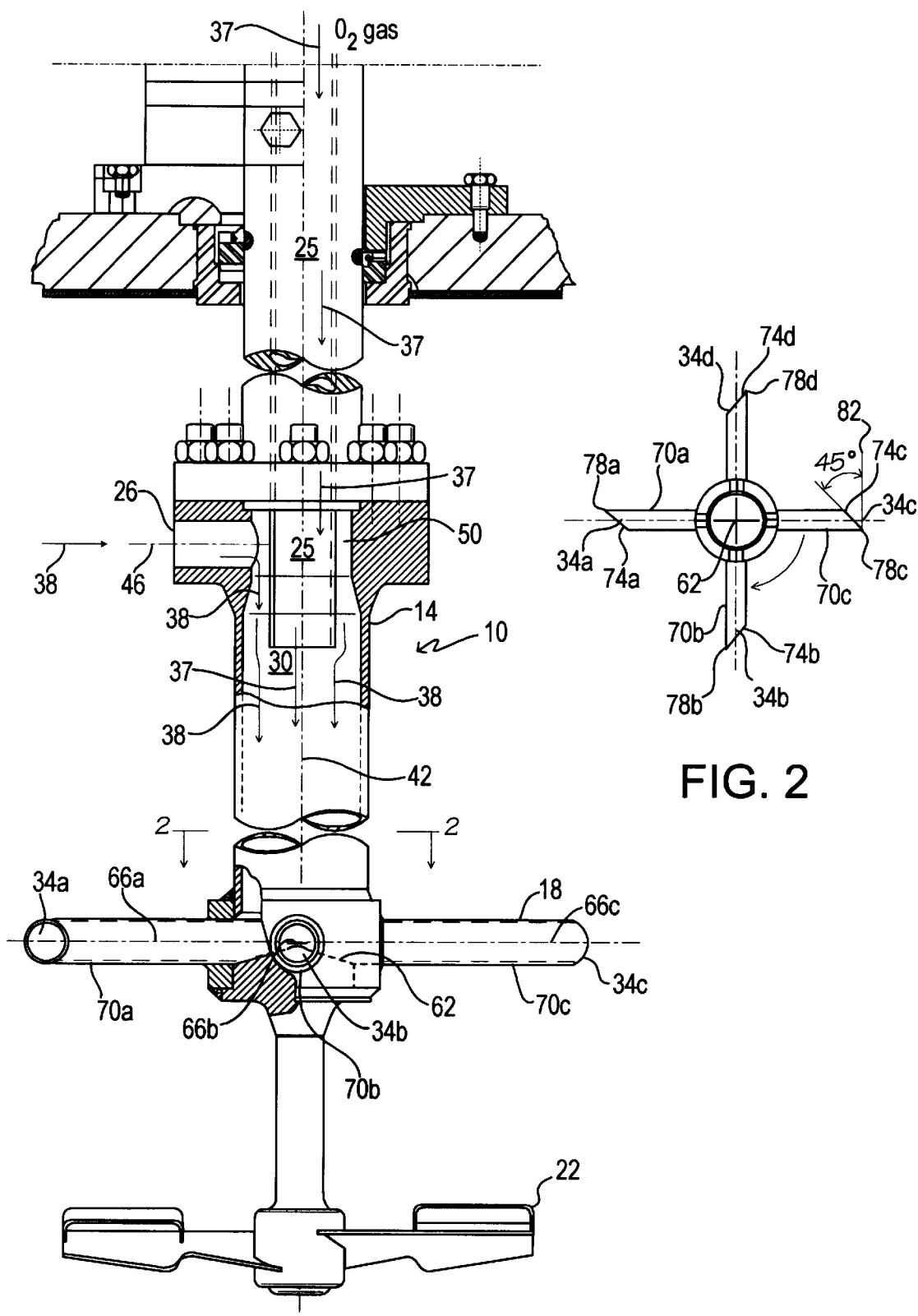
FIG. 1 depicts a side view of the interconnected impeller and the rotatable shaft of the agitation assembly, with certain parts of the agitation assembly being shown in cross-section.
FIG. 2 is a cross-sectional view taken along line 2—2 of FIG. 1.

Referring to FIGS. 1 and 2, the agitation assembly 10 is depicted. The agitation assembly 10 includes a rotatable shaft 14, a gas injecting impeller 18 and a mixing impeller 22 connected to the lower end of the shaft 14, and a motor (not shown) connected to the upper end of the shaft 14 for rotating the shaft 14 during pressure oxidation.

The rotatable shaft 14 includes a gas inlet 26 in communication with a conduit 30 extending longitudinally along the shaft 14. The conduit 30 is in communication with a number of conduits 34a–d in the gas injecting impeller 18 for dispersing the gas substantially uniformly throughout the slurry. A fresh oxygen-containing gas 37 from an oxygen supply plant or the ambient atmosphere can be introduced to the slurry via an inner conduit 25, the conduit 30, and finally radially outward through the conduits 34a–d. An oxygen-containing gas 38 is recycled from the autoclave atmosphere via inlet 26 (which is open to the autoclave interior) because rotation of the impeller 18 creates a negative pressure at the tips 78a–d of the blades which draws the gas through the inlet 26. The fresh oxygen-containing gas 37 mixes with the recycled oxygen-containing gas 38 downstream (or below) the outlet 39 of the inner conduit 25 and the mixed gas is outputted by the conduits 34a–d.

The relative orientations and dimensions of the inlet 26 and shaft conduit 30 are important. The longitudinal axis 42 of the conduit 30 is substantially normal (i.e., transverse) to the longitudinal axis 46 of the inlet 26. The conduit 30 and shaft 14 are coaxial and therefore have the same longitudinal axis 42. The relationship between the cross-sectional area of the inlet 26 normal to the direction of flow (i.e., normal to the inlet longitudinal axis 46) depends upon a number of factors including the desired oxygen transfer rate, the compartment size of the autoclave, the operating oxygen partial pressure, the slurry viscosity, and the like.

The bottom 62 of the conduit 30 is may be conically shaped in a convex orientation to effectuate redirection of the gas into the conduits 34a–d of the impeller 18. In this manner, eddies and other disturbances in the gas flow in response to the sudden change of direction are substantially minimized.

To facilitate dispersion of the gas in the slurry, the gas injecting impeller 18 has the outlet face 74a–d of each impeller blade 70a–d angled away from the direction of rotation of the gas injecting impeller 18 such that a shear zone exists at the tip 78a–d of each blade 70a–d to provide superior atomization and dispersion of the oxygen-containing gas (and therefore finer bubble formation). The outlet face 74a–d of each conduit 34a–d faces away from the direction of rotation while the longest side of the blade 70a–d faces in the direction of flow. The angle between the outlet face 74a–d and the tangent 82 of a circle defined by rotation of the tips 78a–d of the blades 70a–d is preferably about forty-five degrees.

The gas injecting impeller 18 is located at a depth in the autoclave slurry that maximizes effective gas transfer and dispersion. Locating the impeller below this optimum depth increases the hydraulic head that the impeller has to overcome to draw down the gas phase into the agitated slurry. This can significantly and unnecessarily increase the power required to maintain a given oxygen transfer rate.

The mixing impeller 22 is located below the gas injecting impeller 18 at a suitable depth to maintain in suspension the solid particles in the autoclave in the slurry and to assist in distribution of the entrained gas bubbles in the slurry. Typically, the concentration of gas bubbles in the upper portion of the slurry (which contains the gas-injecting impeller 18) is greater than the gas bubble concentration in the lower portion of the slurry (which contains the mixing impeller 22).

Figure 3:
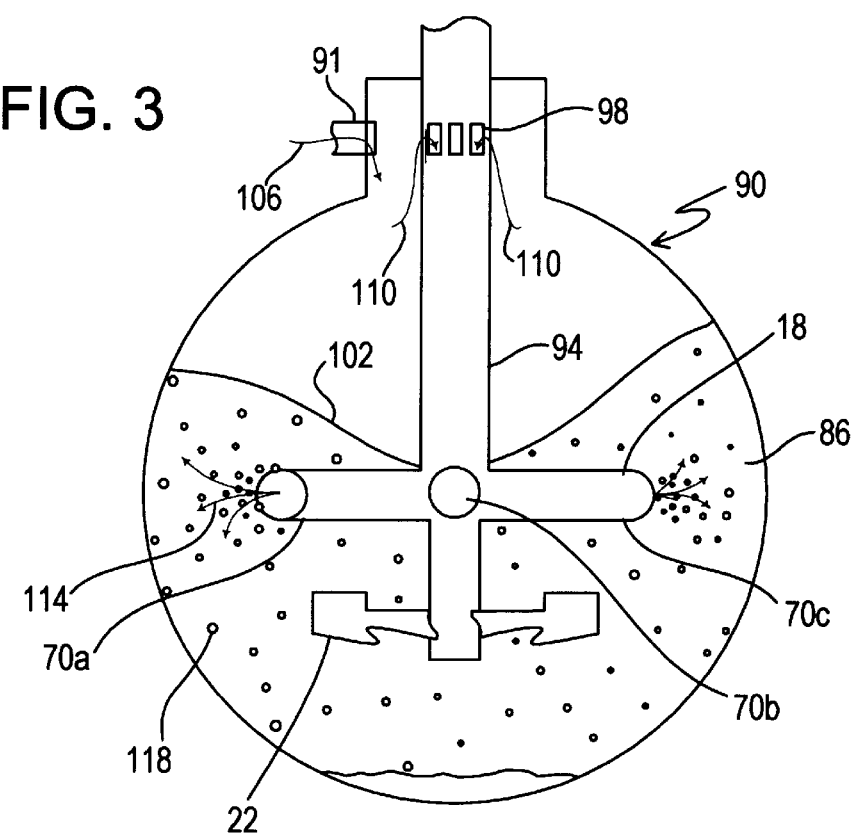
FIG. 3 depicts the agitation assembly operating in an autoclave.

Referring to FIG. 3, the operation of the agitation assembly will be described. During introduction of the sulfide-containing slurry 86 into the autoclave 90, the rotatable shaft 94 is rotated in a clockwise direction to induce turbulence in the slurry. Unlike the rotatable shaft 14 of FIGS. 1 and 2, the rotatable shaft 94 of FIG. 3 has a plurality of open inlets 98 that are open to the atmosphere in the autoclave 90 and an inner conduit extending the length of the shaft 94 to transport fresh oxygen gas from a source exterior to the autoclave. Rather, fresh oxygen 106 is introduced directly into the autoclave atmosphere via inlet 91 and drawn into the open inlets 98 and through a conduit (not shown) extending longitudinally along the shaft and finally through the blades and dispersed into the slurry. A vortex 102 forms where the shaft 94 is immersed in the slurry 86. An oxygen gas 106 is introduced into the autoclave and mixed with recirculated gas 110 drawn into the shaft via the inlets 98. The mixed gas 114 is dispersed radially outwardly, during rotation of the blades 70a–d, in the slurry 86. The mixing impeller 22, which rotates at the same rate and in the same direction as the gas injecting impeller 18, further assists in dispersing the gas bubbles 118 throughout the slurry 86, maintains in suspension the solid particles in the slurry, and provides a turnover of slurry from the bottom to the top of the vessel on a continuous basis.

The autoclave 90 is able to realize high oxygen transfer rates into the slurry 86. Typically, the oxygen transfer rate is at least about 2 kg moles and more typically at least about 4 kg moles and most typically ranges from about 2 kg moles to about 12 kg moles of molecular oxygen/cubic meter of slurry/hour. At such high transfer rates, the conversion of the metal sulfides into soluble metal salts or oxidized metal precipitates can be substantially completed (i.e., 90% or more) in residence times as short as about 60 minutes and more typically in as short as about 30 minutes.

Figure 4:
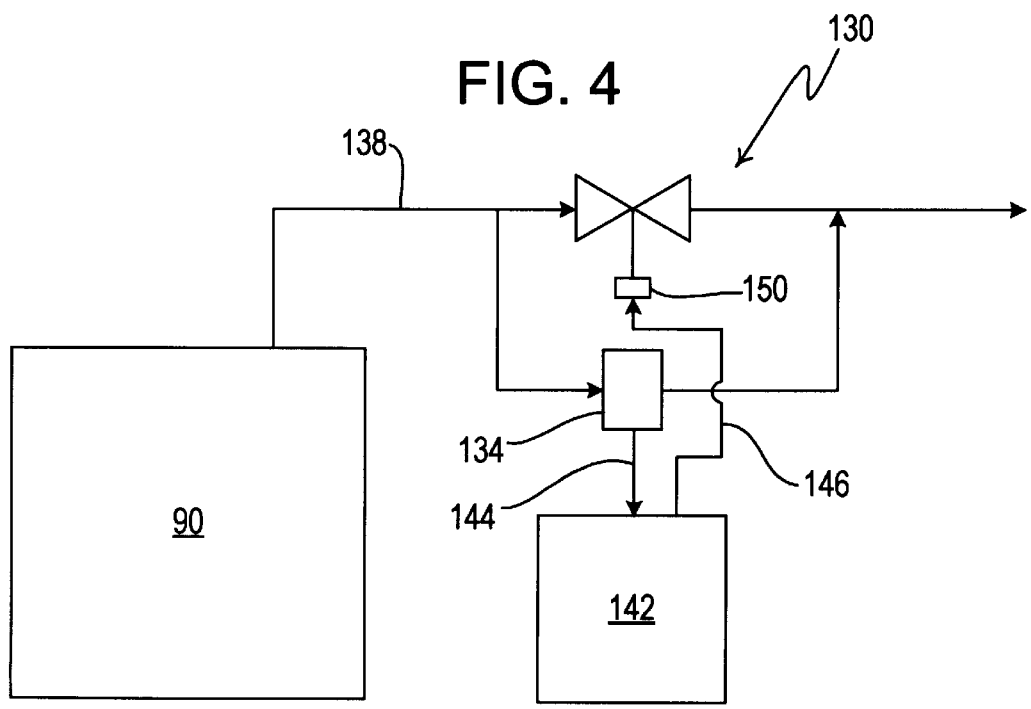
FIG. 4 is a flow schematic depicting the discharge control system.

FIG. 4 depicts a discharge control system for controllably removing the gas atmosphere from the autoclave 90 to prevent rupture of the autoclave 90 from high pressure gases. The system 130 includes a gas analyzer 134 for analyzing, either continuously or at suitable intervals of time, a selected component in the gas atmosphere in the autoclave 90, a vent 138 for venting the gas in the atmosphere, a controller 142 to monitor the signal 144 from the gas analyzer 134 and generate a control signal 146 in response thereto, and a control device 150 for controlling the amount of gas discharged into the exterior atmosphere in response to the control signal 146.

The selected component monitored by the gas analyzer 134 can be molecular oxygen, carbon dioxide, argon, and nitrogen, with molecular oxygen being most preferred.

When a threshold concentration, or partial pressure, of the selected component is reached, the controller 142 forwards a control signal to the control device 150 to open and release gas in the autoclave atmosphere. Preferably, the threshold is set such that the ratio of the partial pressure of oxygen to the partial pressure of nonoxygen compounds (e.g., carbon dioxide) ranges from about 1:4 to about 4:1 and more preferably from about 1:2 to about 2:1. Accordingly, when the partial pressure of oxygen drops below a certain level, i.e., when the ratio falls below the threshold, the control device 150 opens and the autoclave gas phase is vented to the atmosphere. Fresh "pure" oxygen is introduced at this time to maintain the autoclave operating pressure setpoint. The control device 150 closes either after the valve has been opened for a specified predetermined time or alternately, may be closed when the partial pressure of oxygen is restored to a specified setpoint.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for recovering a metal from a metal-containing material by autoclaving, comprising:
   (a) providing an autoclave containing a metal-containing material in a metal-containing slurry and an agitation assembly;
   (b) agitating the metal-containing slurry in the autoclave by rotating a rotatable shaft that is part of the agitation assembly, the rotatable shaft including (i) a first inlet located above the slurry surface for removing a recycled gas from the interior of the autoclave; (ii) a second inlet for a fresh oxygen-containing gas from a source external to the autoclave; (iii) a plurality of outlets extending outwardly from an intermediate portion of the shaft and located at intervals around the periphery of the shaft such that the outlets rotate when the shaft rotates; (iv) a passage in the rotatable shaft connecting the first and second inlets with the plurality of outlets; and (v) a plurality of mixing blades located on an end portion of the shaft and below the plurality of outlets, wherein during the agitating step (b), an oxygen-containing gas that includes the recycled gas and fresh oxygen-containing gas is passed through the rotatable shaft and the plurality of outlets and dispersed radially outwardly from the shaft into the slurry; and
   (c) recovering the metal.

2. The method of claim 1, wherein the plurality of outlets are inclined inwardly towards the shaft and wherein the outermost edge of each outlet forms the leading edge of each of the plurality of outlets during shaft rotation.

3. The method of claim 1, wherein step (b) comprises:
   measuring a selected component of a gas atmosphere in the autoclave, the gas atmosphere being located above the metal-containing slurry and
   when the amount of the component exceeds or falls below a threshold, removing at least a portion of the gas atmosphere from the autoclave.

4. The method of claim 3, wherein the selected component is selected from the group consisting of molecular oxygen, carbon dioxide, argon, and nitrogen.

5. The method of claim 3, wherein the rate of removal of the gas atmosphere varies over time.

6. The method of claim 1, wherein the plurality of blades are shorter than the plurality of outlets.

7. The method of claim 1, wherein step (b) includes combining the recycled gas and fresh gas in the passage.

8. The method of claim 7, wherein the fresh gas includes molecular oxygen that has not yet been introduced into the autoclave.

9. The method of claim 1, wherein the metal is in the form of a sulfide and the metal is gold, iron, copper, zinc, and nickel.

10. The method of claim 4, wherein the threshold is a ratio of the partial pressure of molecular oxygen to the partial pressure of nonoxygen compounds and is within a range of from about 1:4 to about 4:1.

11. The method of claim 1, wherein step (c) includes:
    measuring a selected compound of a gas atmosphere in the autoclave;
    when the ratio of a partial pressure of the selected component is less than a threshold amount, opening an output to the autoclave to remove at least a portion of the gas atmosphere; and
    when the output has been open for a predetermined time or when the partial pressure of the selected component is at a specified setpoint that is at or above the threshold amount.

12. A method for recovering a slurried metal from a metal-containing material by autoclaving, comprising:
    (a) providing an autoclave that includes a sealed vessel and an agitator located in the sealed vessel, the agitator including (i) at least a first inlet located above a surface of a slurried metal-containing material and in communication with the interior of the sealed vessel, the at least a first inlet removing a recycled gas including oxygen from the interior of the sealed vessel; (ii) a second inlet in communication with an oxygen source located outside of the sealed vessel, the second inlet providing a fresh gas including oxygen from the oxygen source; (iii) an outlet located below the surface of the slurried metal-containing material for introducing the recycled and fresh gases into the slurried metal-containing material; and (iv) a passage in a shaft of the agitator, the passage being in communication with the first and second inlets and the outlet;
    (b) rotating the agitator to agitate the slurried metal-containing material, wherein during rotation of the agitator the recycled and fresh gases are passed through the outlet and into the slurried metal-containing material to facilitate oxidation of a metal-containing compound in the slurried metal-containing material; and
    (c) thereafter recovering the metal in the metal-containing material.

13. The method of claim 12, wherein the outlet includes a plurality of outlets inclined inwardly towards the shaft and wherein the outermost edge of each outlet forms the leading edge of each of the plurality of outlets during shaft rotation.

14. The method of claim 12, further comprising:
    measuring a selected component of a gas atmosphere in the interior, the gas atmosphere being located above the metal-containing slurry and
    when the amount of the component exceeds or falls below a threshold, removing at least a portion of the gas atmosphere from the autoclave.

15. The method of claim 14, wherein the selected component is selected from the group consisting of molecular oxygen, carbon dioxide, argon, and nitrogen.

16. The method of claim 14, wherein the rate of removal of the gas atmosphere varies over time.

17. The method of claim 12, wherein a plurality of mixing blades located below the outlet are each shorter than the outlet.

18. The method of claim 12, wherein step (b) includes combining the recycled gas and fresh gas in the passage.

19. The method of claim 18, wherein the fresh gas includes molecular oxygen that has not yet been introduced into the autoclave interior.

20. The method of claim 14, wherein the threshold is a ratio of the partial pressure of molecular oxygen to the partial pressure of nonoxygen compounds and is within a range of from about 1:4 to about 4:1.

21. The method of claim 12, further comprising:

measuring a selected component of a gas atmosphere in the interior;

when the ratio of a partial pressure of the selected component is less than a threshold amount, opening an output to the autoclave to remove at least a portion of the gas atmosphere; and when the output has been open for a predetermined time or when the partial pressure of the selected component is at a specified setpoint that is at or above the threshold amount, closing the output to the autoclave.

22. A method for recovering a metal from a slurried metal-containing material by autoclaving, comprising:

(a) providing an autoclave that includes a sealed vessel and an agitator located in the sealed vessel, the agitator including (i) at least a first inlet located above a surface of a slurried metal-containing material and in communication with the interior of the sealed vessel, the at least a first inlet removing a recycled gas including oxygen from the interior of the sealed vessel; (ii) a second inlet in communication with an oxygen source located outside of the sealed vessel, the second inlet providing a fresh gas including oxygen from the oxygen source; (iii) a plurality of outlets located below the surface of the slurried metal-containing material for introducing the recycled and fresh gases into the slurried metal-containing material; (iv) a passage in a shaft of the agitator, the passage being in communication with the first and second inlets and the plurality of outlets; and (v) an impeller engaging the shaft and located below the plurality of outlets;

(b) rotating the agitator to agitate the slurried metal-containing material wherein during rotation of the agitator the recycled and fresh gases are passed through the plurality of outlets and into the slurried metal-containing material to facilitate oxidation of a metal-containing compound in the slurried metal-containing material; and (c) thereafter recovering the metal in the metal-containing material.

* * * * *